United States Patent
Stinson, III (10) Patent No.: US 8,812,863 B2
(45) Date of Patent: Aug. 19, 2014

(54) PERSONAL BIOMETRIC SYSTEM AND METHOD FOR WIRELESS DEVICE CONTROL

(76) Inventor: Willis D. Stinson, III, Lexington, MA (US)

( * ) Notice: Subject to any disclaimer, the term of this patent is extended or adjusted under 35 U.S.C. 154(b) by 87 days.

(21) Appl. No.: 13/526,173

(22) Filed: Jun. 18, 2012

(65) Prior Publication Data

US 2013/0339748 A1    Dec. 19, 2013

(51) Int. Cl.

| | |
|---|---|
| G06F 21/00 | (2013.01) |
| G06F 7/04 | (2006.01) |
| G06F 21/34 | (2013.01) |
| G06F 21/32 | (2013.01) |
| G06F 21/83 | (2013.01) |
| G06F 12/14 | (2006.01) |
| G07C 9/00 | (2006.01) |
| H04L 9/32 | (2006.01) |
| H04L 29/06 | (2006.01) |

(52) U.S. Cl.
CPC .............. *G06F 21/34* (2013.01); *G06F 21/32* (2013.01); *G06F 21/83* (2013.01); *G07C 9/00563* (2013.01); *H04L 9/3231* (2013.01); *H04L 63/0861* (2013.01)
USPC ............................................. 713/186; 726/18

(58) Field of Classification Search
CPC ......... G06F 21/32; G06F 21/34; G06F 21/83; H04L 63/0861; H04L 9/3231; G07C 9/00563

USPC ................................................ 713/186; 726/18
See application file for complete search history.

(56) References Cited

U.S. PATENT DOCUMENTS

| | | | |
|---|---|---|---|
| 7,543,156 B2 * | 6/2009 | Campisi ....................... 713/186 |
| 2005/0229007 A1 | 10/2005 | Bolle et al. |
| 2008/0103984 A1 * | 5/2008 | Choe et al. ...................... 705/76 |
| 2009/0010503 A1 * | 1/2009 | Mathiassen et al. .......... 382/125 |
| 2009/0201128 A1 * | 8/2009 | Campisi ...................... 340/5.53 |
| 2011/0205016 A1 * | 8/2011 | Al-Azem et al. ............ 340/5.52 |
| 2012/0131230 A1 * | 5/2012 | Ady et al. ......................... 710/8 |

* cited by examiner

*Primary Examiner* — Michael Simitoski
(74) *Attorney, Agent, or Firm* — McCarter & English, LLP (57) ABSTRACT

In one embodiment, a biometric device includes a first portion having a processor and a second portion releasably coupled to the first portion. The processor is configured to determine whether the second portion is coupled to the first portion. The processor is configured to operate in an enrollment mode while the first portion is coupled to the second portion and operate in an authentication mode while the first portion is decoupled from the second portion. In one embodiment, a method of biometric authentication includes, first, coupling two portions of a biometric device to put it into an enrollment mode, collecting a biometric sample, and generating and storing a corresponding enrollment code; and second, decoupling the two portions of the biometric device, collecting a biometric sample, generating a corresponding access code, and granting or denying access to an asset based on comparison of the enrollment code and the access code.

10 Claims, 7 Drawing Sheets

PERSONAL BIOMETRIC SYSTEM AND METHOD FOR WIRELESS DEVICE CONTROL

BACKGROUND

1. Field of Invention

Embodiments of the invention relate generally to biometric-based security authentication, and more particularly, to apparatus and methods for biometric enrollment and verification.

2. Description of Related Art

Biometrics refers to using the physical traits and characteristics of an individual for the purposes of identification and security. The biometrics should be sufficiently different across the population such that individuals can be uniquely identified. Examples of biometrics include biological and/or behavioral characteristics, such as fingerprints, voice prints, and DNA, among others. Conventional biometric authentication techniques have been used to restrict access to certain types of physical and electronic assets by comparing one or more biometric samples of a person against stored biometrics that are obtained under secure and controlled conditions.

For biometric authentication, each individual must enroll a biometric sample for use in subsequent identity verification. Enrollment often involves obtaining the sample under controlled conditions, such as where an authority separately verifies the individual's identity at the time of enrollment using a driver's license, passport or other independently verifiable form of identification. Such control enables the authority to certify that the sample is truly from the individual in question. The certified sample may then be stored in a secure manner for comparison with verification biometric samples acquired in the future. If such a comparison yields a match, then the identity of the individual can be authenticated on the basis of the biometric alone.

SUMMARY

Various embodiments are directed to systems and methods for biometric enrollment and authentication where the user acts as the enrolling authority.

In one embodiment, a biometric device includes a first portion having a processor and a second portion releasably coupled to the first portion. The processor is configured to determine whether the second portion is coupled to the first portion. The processor is configured to operate in an enrollment mode while the first portion is coupled to the second portion and operate in an authentication mode while the first portion is decoupled from the second portion.

In one embodiment, a method of biometric authentication includes coupling a first portion of a biometric device to a second portion of the biometric device, acquiring enrollment biometric data from a user via a biometric sensor disposed on the first portion of the biometric device while the second portion of the biometric device is coupled to the first portion of the biometric device, and generating, by a processor operatively coupled to the biometric sensor, an enrollment code based at least in part on the enrollment biometric data.

In another embodiment, the method may further include decoupling the second portion of the biometric device from the first portion of the biometric device, acquiring verification biometric data from the user via the biometric sensor while the second portion of the biometric device is decoupled from the first portion of the biometric device, and generating, by the processor, an access code based at least in part on the verification biometric data.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the present invention are directed toward biometric enrollment and authentication. The proliferation of personal mobile devices such as smart phones and tablets, GPS-based devices, personal fitness devices, medical monitoring systems, wearable HD video cameras for action sports, wireless fobs for security gates and keyless car entry, etc., presents new security challenges for users, including how to protect these devices and systems with a consistent, easy to use, and self-administered security mechanism. Embodiments may be used to enable secure, personal access to wearable computing devices, ambient computing, and other wireless devices based on a biometric mechanism that can be set up and administered by users without the involvement of any third party or enrolling authority.

In one embodiment, a biometric authentication system may be used to restrict access to an asset, such as a physical object or electronic data. The user of the system may act as a controlling authority for enrolling biometric samples. The system includes an authentication device configured to collect and process biometric samples and one or more verification devices for securing or restricting access to one or more assets. The authentication device may compute a code or key based on the biometric samples and wirelessly transmit the code to the verification device(s). Once received, the verification device(s) may compare the code to an enrolled code stored in memory as a basis for permitting or denying access to the asset. Each authentication device and verification device may include a first portion releasably coupled to a second portion, wherein the respective device is configured to operate in an enrollment mode while the first portion is coupled to the second portion, and in an authentication mode while the second portion is not coupled to the first portion.

Figure 1:
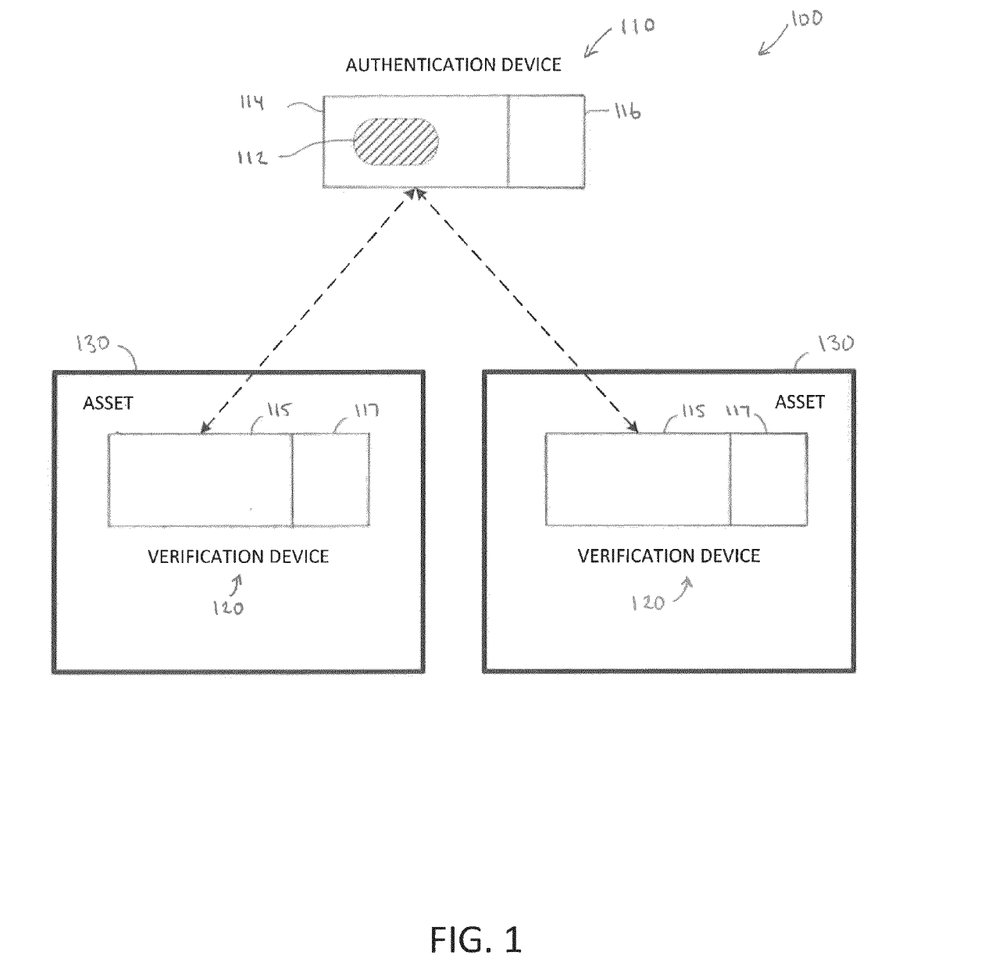
FIG. 1 is a block diagram representing one example of a system for biometric authentication, in accordance with one embodiment.

FIG. 1 is a block diagram of a system 100 for use in biometric authentication, according to one embodiment. The system 100 includes an authentication device 110 and one or more verification devices 120. The authentication device 110 and the verification device 120 may each respectively include a first portion 114, 115, and a second portion 116, 117 that may be connected to and disconnected from the first portion. The authentication device 110 may further include a biometric sensor 112 for obtaining a biometric sample from a user. Examples of biometrics include a fingerprint, a palm vein scan, a facial image, an iris scan, a voice sample, and a DNA sample, among others.

In one embodiment, each verification device 120 may be coupled to an asset 130 in a manner that permits the verification device 120 to restrict access to at least a portion of the asset. For example, the verification device 120 may include one or more locking mechanisms (not shown) for physically and/or electronically securing the asset 130 so that the asset or any resources therein cannot be utilized while the asset is locked. For example, the electronic locking mechanism may include a password, encryption or other data security mechanisms for protecting logical assets in the asset 130, including data, code, processing resources, memory or data storage resources, networking resources, or other information or electronic resources of the asset. Other ways of securing the asset 130 may be used, such as placing the asset into a lockable container and configuring the verification device 120 to restrict access to the contents of the container.

Figure 2A:
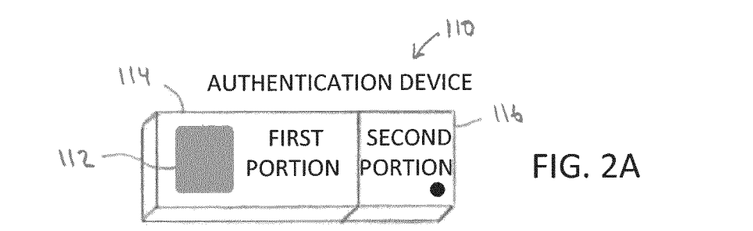
FIGS. 2A and 2B are perspective views of one example of an authentication device for biometric authentication, in accordance with one embodiment.
Figure 2B:
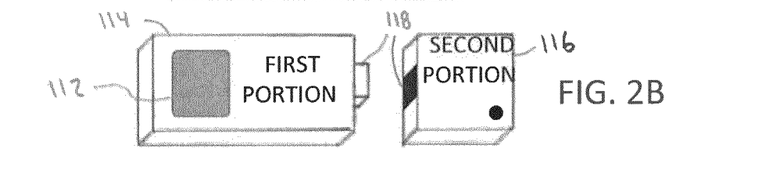
Figure 2C:
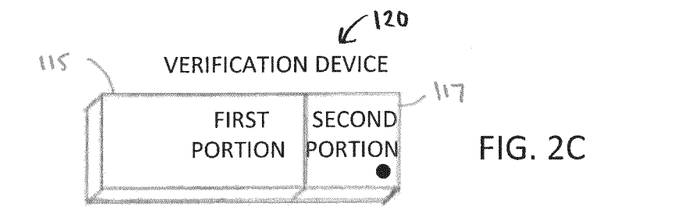
FIGS. 2C and 2D are perspective views of one example of a verification device for biometric authentication, in accordance with one embodiment.
Figure 2D:
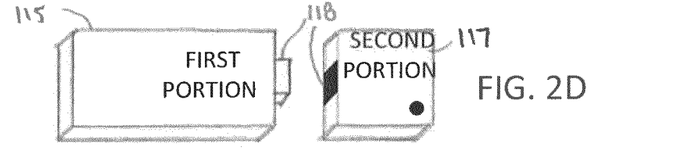

FIGS. 2A and 2B are perspective views of one example of the authentication device 110 of FIG. 1, according to one embodiment. The authentication device 110 includes two portions 114 and 116, which are releasably coupled to each other at an interface 118. The interface 118 may include an electrical interface or other type of interface that permits the two portions 114 and 116 to be physically attached to, and detached from, each other and further permits the authentication device 110 to determine whether the two portions 114 and 116 are so attached or detached. FIGS. 2C and 2D are perspective views of one example of the verification device 120, which may be substantially identical to the authentication device 110 shown in FIGS. 2A and 2B, except that the verification device 120 may not include the biometric sensor 112 but rather has a locking mechanism (not shown), such as discussed above with respect to FIG. 1, for securing or protecting a logical or physical asset 130.

In one embodiment, the authentication device 110 and the verification device 120 are each configured to operate in at least one of two operating modes: an enrollment mode and an authentication mode, such as described below and with respect to FIGS. 4 and 5, respectively. For instance, while the authentication device 110 and the verification device 120 are operating in the enrollment mode, a biometric sample of a user may be enrolled or stored for subsequently authenticating the user against another biometric sample acquired while the authentication and verification devices are operating in the authentication mode. The operating mode of each device may be determined based on a physical configuration of the respective device, for instance, whether the first portion 114, 115 and the second portion 116, 117 of each device are connected together or disconnected from each other. For example, the user may snap the first portion 114 of the authentication device 110 to the second portion 116, placing the authentication device into the enrollment mode, or disconnect the first portion from the second portion, placing the authentication device into the authentication mode. Likewise, the user may snap the first portion 115 of the verification device 120 to the second portion 117, placing the verification device into the enrollment mode, or disconnect the first portion from the second portion, placing the verification device into the authentication mode. Because the user physically controls both portions of the authentication device 110 and the verification device 120, the user is effectively acting as a control authority for collecting and storing a biometric sample.

While the authentication device 110 is operating in the enrollment mode, the user may provide a biometric sample, such as a fingerprint, using the biometric sensor 112, which is included in the authentication device 110. The authentication device 110 may then compute an enrollment code based on the biometric sample. The enrollment code may be wirelessly transmitted by the authentication device 110 to any nearby or remote verification devices 120 (e.g., locally via a wireless network such as WiFi®, ZigBee® or Z-Wave®, a wireless signal such as an infrared signal or other low-power radio signal, or remotely via a data communication network, such as the Internet, a cellular network, and so forth), which receive and store the enrollment code while also operating in the enrollment mode. If the verification device 120 is not operating in the enrollment mode, the enrollment code may be ignored by the verification device 120 or processed as an access code, such as described below. In some embodiments, the enrollment code, and any other data that is wirelessly transmitted by the authentication device 110 or the verification device 120, may be encrypted using, for example, SSL (secure sockets layer).

Once the enrollment code has been distributed to each verification device 120, the user may physically separate the two portions 114, 116 of the authentication device 110 and the two portions 115, 117 of the verification device(s) 120. Separating the first portion 114, 115 from the second portion 116, 117 causes the first portion of the authentication device 110 or verification device(s) 120, respectively, to operate in the authentication mode. The second portion 116, 117 may be stored in a secure location, such as a safe, or a locked drawer or room, to prevent the corresponding first portion 114, 115 from operating in the enrollment mode. While operating in the authentication mode, the authentication device 110 and the verification device 120 may each be configured to verify user identities using biometric samples collected from the user. Further, while operating in the authentication mode, neither the authentication device 110 nor the verification device 120 can be initialized with a different enrollment code. Once in authentication mode, the authentication device 110 may collect an additional biometric sample, compute an access code based on the sample, and compare the access code to the enrollment code stored in the authentication device 110. If the access code matches the enrollment code, the authentication device 110 may wirelessly transmit the access code to any nearby verification device 120. The verification device 120 compares the access code to the enrollment code stored in the memory verification device 120. If the access code matches the enrollment code, the verification device 120 may grant access to the asset 130; otherwise, the verification device 120 may deny access to the asset 130. In some embodiments, the access code, and any other data that is wirelessly transmitted by the authentication device 110 or the verification device 120, may be encrypted using, for example, SSL (secure sockets layer).

As discussed above, the authentication device 110 may be configured to transmit a signal (e.g., wirelessly) to one or more of the verification devices 120. In one embodiment, such as described below with respect to FIGS. 3A and 3B, the authentication device 110 includes a transmitter 214 and antenna 215 for transmitting the signal, and the verification device 120 includes a receiver 314 and antenna 315 for receiving the signal. In some embodiments, the transmitter 214 and/or the receiver 314 may be configured to both transmit and receive signals. The signal may include the enrollment code and/or the access code, depending on the operating mode of the authentication device 110, as well as any communication protocol information.

Figure 3A:
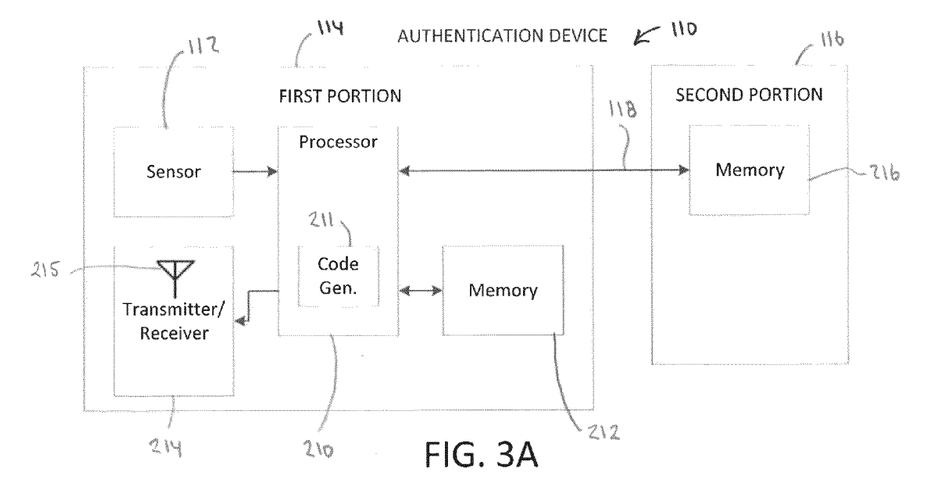
FIGS. 3A and 3B are block diagrams representing some components of the devices of FIGS. 2A-2D in greater detail, in accordance with one embodiment.

FIG. 3A depicts another example of the authentication device 110 of FIG. 1 in greater detail, according to one embodiment. The first portion 114 includes a processor 210, a first memory 212, the biometric sensor 112, a transmitter/receiver 214 and the interface 118, each of which is operatively coupled to the processor 210. The second portion 116 of the authentication device 110 may include a second memory 216, which may be operatively coupled to the processor 210 via the interface 118 while the second portion 116 is coupled to the first portion 114. The second memory 216 in the second portion 116 may, for example, be configured for use by the processor 210 for determining whether the second portion 116 is coupled to the first portion 114. For instance, the processor 210 may determine that the second portion 116 is coupled to the first portion 114 by attempting to read and/or write data to the second memory 216 via the interface 118. If the read or write operation is successful, then the processor 210 may determine that the first portion 114 is coupled to the second portion 116 (e.g., for placing the first portion 114 into the enrollment mode of operation); otherwise, the processor 210 may determine that the first portion 114 is not coupled to the second portion 116 (e.g., for placing the first portion 114 into the authentication mode of operation). The processor 210 may, for example, repeatedly or cyclically attempt to determine whether the first portion 114 and the second portion 116 are coupled together on a regular basis (e.g., every several seconds). In another example, the second portion 116 may be configured to complete an electrical circuit of the first portion 114 when the two portions are coupled together. The processor 210 may determine whether the first portion 114 is coupled to the second portion 116 based on whether the circuit is closed or open.

In one embodiment, the first portion 114 and the second portion 116 of the authentication device 110 may each be programmed with an identification number or code (e.g., a unique identification number associated with the hardware of the authentication device 110), which is used to match corresponding portions of the device together. Thus, as a security measure, the first portion 114 may be configured to operate in the enrollment mode only if the second portion 116 contains a matching identification number or code to prevent unauthorized enrollment when attempting to use a mismatched second portion 116.

Within the authentication device 110, the biometric sensor 112 may, for example, be configured to collect biometric samples, such as fingerprints, and provide digital representations of the samples to the processor 210. The processor 210 may be configured to read the digitized samples, compute various codes or keys using a code generator 211, and compare the computed codes with codes previously stored in the memory 212. The specific codes computed, and the sequence of control steps used, depend on whether the authentication device 110 is operating in the enrollment mode (i.e., while the first portion 114 is physically connected to the second portion 116), or in the authentication mode (i.e., while the first portion 114 is not physically connected to the second portion 116). Several examples relating to the functions that may be performed by the processor 210 are described below.

In one embodiment, the memories 212 and 216 may be used by the processor 210 to store codes and/or log information, and as local working memory for program execution.

The processor 210 is connected to the memory 212, and can therefore normally access it. By design, however, the processor 210 may be physically separated from the memory 216 while the first portion 114 is disconnected from the second portion 116 of the authentication device 110. The processor 210 may be configured to determine the operating state of the authentication device 110 based on whether it can access (e.g., read to and/or write from) the memory 216 and/or whether the processor 210 can read a unique hardware identification code associated with the second portion 116 to verify that the hardware identification code matches a corresponding hardware identification code of the first portion 114. For example, if the processor 210 can access the memory 216 or if the hardware identification code matches, then the first portion 114 and the second portion 116 are connected, and the authentication device 110 may operate in the enrollment mode. If the processor 210 cannot access the memory or if the hardware identification code does not match, then the first portion 114 and the second portion 116 are separated, and the authentication device 110 may operate in the authentication mode. Thus, the functions performed by the processor 210 may be different depending on which of the two modes the authentication device 110 is in.

As described above, the authentication device 110 includes the transmitter/receiver 214 for wirelessly communicating codes to any nearby verification device(s) 120. The system may be configured to use Bluetooth, NFC, Wireless USB, WiFi®, ZigBee® or Z-Wave®, or any other short range wireless technology.

In one embodiment, the functions of the authentication device 110 may be described with respect to the pseudo-code below. For example, let:

a1 = authentication device, first portion
a2 = authentication device, second portion
s = most recent biometric sample collected by the authentication device
f( ) = function to compute enrollment key (key1)
g( ) = function to compute access key (key2)

Figure 3B:
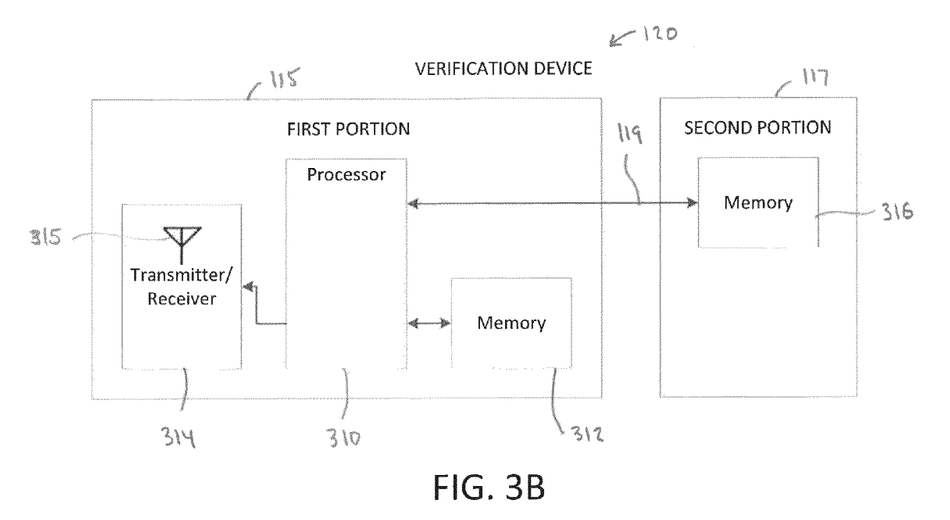

The authentication device 110 and the verification device 120 may each include a clock coupled to the respective processor 210, 310. The functions f( ) and/or g( ) may be identical in the verification device 120 (described below) and in the authentication device 110. Further, since the function g( ) takes time (e.g., from the clock of the respective device) as an input parameter, the time may be synchronized between the authentication device 110 and the verification device 120 (e.g., synchronized during factory initialization or using a synchronization signal transmitted from one device to another). To compensate for latency or imperfect clock synchronization, the function g( ) may permit a small amount of error to occur between the clock of the authentication device 110 and the clock of the verification device 120.

When the authentication device 110 is in the enrollment mode (i.e., with the first portion 114 physically connected to the second portion 116), the authentication device 110 may generate and distribute an enrollment code or key as follows:

```
enroll(s, a1)
{
    key1 = f(s, a1.id);        // compute and save enrollment key
    send(key1);                // send key to verification devices(s)
}
```

When the authentication device 110 is in the authentication mode (i.e., with the first portion 114 physically separated from the second portion 116), the authentication device 110 may perform authentication as follows:

```
verify(s, a1)
{
    time = now( );
    if (f(s, a1.id) == key1)              // if enrollment key matches
        key2 = g(key1, time);             // generate access key
    else
        key2 = random(time);              // generate "noise" key
    send(key2);                           // send key to verification
                                          //   device(s)
}
```

The main authentication device control loop may then be as follows:

```
main( )
{
    while (TRUE)
    {
        if (s = collect(a1))              // collect biometric sample
        {
            if (attached(a1, a2))         // first and second portions
                                          //   attached
            {
                if (a1.id == a2.id)       // if portion IDs match
                    enroll(s, a1);        // then distribute enrollment
                                          //   key
                else
                    sleep 5;              // unauthorized attempt;
                                          //   slow down
            }
            else
                verify(s, a1);            // check access key
        }
    }
}
```

In one embodiment, a lockout mechanism may be implemented in software to limit the number of enrollment attempts by unauthorized devices as follows:

```
main( )
{
    unlock(a1);                           // initialize authentication
                                          //   device, unlocked
    while (TRUE)
    {
        if (!locked(a1))
        {
            if (s = collect(a1))          // collect biometric sample
            {
                if (attached(a1, a2))     // first and second portions
                                          //   attached
                {
                    if (a1.id == a2.id)   // if portion IDs match
                        enroll(s, a1);    // then distribute
                                          //   enrollment key
                    else
                    {
                        lock(a1);         // lock authentication
                        sleep 5;          // device from use
                                          //   unauthorized attempt;
                                          //   slow down
                    }
                }
                else
                    verify(s, a1);        // check access key
            }
        }
        else if (!attached(a1, a2))       // stay locked until
                                          //   detached
            unlock(a1);
```

```
        else
            sleep 5;                      // still locked;
                                          //   slow down
    }
}
```

The above pseudo-code illustrates the use of a built-in delay after one or more failed attempts to authenticate the user for preventing programmatic guessing of the verification device hardware ID. It will be understood that other methods may be used to prevent unauthorized access, such as setting a maximum number of authentication attempts (retries) before permanently locking the verification device 120 or temporarily inhibiting further attempts.

FIG. 3B shows an example of the verification device 120, according to one embodiment. A first portion 115 and a second portion 117 of the verification device 120 are substantially similar to the first portion 114 and the second portion 116 of the authentication device 110 of FIG. 3A, except that the first portion 115 of the verification device 120 may not include a biometric sensor. The first portion 115 includes a processor 310, a first memory 312, a transmitter/receiver 314 and the interface 119, each of which is operatively coupled to the processor 310. The second portion 117 of the authentication device 120 may include a second memory 316, which may be operatively coupled to the processor 310 via the interface 119 while the second portion 117 is coupled to the first portion 115. The second memory 316 in the second portion 117 may be configured for use by the processor 310 for determining whether the second portion 117 is coupled to the first portion 115 (e.g., by testing whether the memory 316 is readable and/or writable from the processor 310).

The memories 312 and 316 may be used by the processor 310 to store codes and/or log information, and as local working memory for program execution. In one embodiment, the processor 310 is connected to the memory 312, and can therefore normally access it. By design, however, the processor 310 may be physically separated from the memory 316. The processor 310 may be configured to determine the operating state of the verification device 120 based on whether it can access (e.g., read to and/or write from) the memory 316 and/or whether the processor 310 can read a unique hardware identification code associated with the second portion 117 to verify that the hardware identification code matches a corresponding hardware identification code of the first portion 115. For example, if the processor 310 can access the memory 316 or if the identification code matches, then the first portion 115 and the second portion 117 are connected, and the verification device 120 may operate in the enrollment mode. If the processor 310 cannot access the memory or if the identification code does not match, then the first portion 115 and the second portion 117 are separated, and the verification device 120 may operate in the authentication mode. Thus, the functions performed by the processor 310 may be fundamentally different depending on which of the two modes the verification device 120 is in.

In one embodiment, the functions of the verification device 120 may be described with respect to the pseudo-code below. For example, let:

```
v1 = verification device, first portion
v2 = verification device, second portion
g( ) = function to compute access key
```

The main control loop of the verification device 120 may be as follows:

```
main( )
{
    if (attached(v1, v2)        // first and second
                                // portions attached:
                                // enrollment mode
    {
        if (v1.id == v2.id)     // if portion IDs match
            receive(key1);      // then receive/save
                                // enrollment key1
        else
            sleep 5;            // unauthorized attempt;
                                // slow down
    }
    else                        // first and second
                                // portions not
                                // attached: protect
                                // mode
    {
        if ((receive(test_key) &&
            (test_key == g(key1, time)))  // if access keys match
            enable(host);                 // then enable the
                                          // wireless device
        else
            disable(host);                // else disable it
    }
}
```

Figure 4:
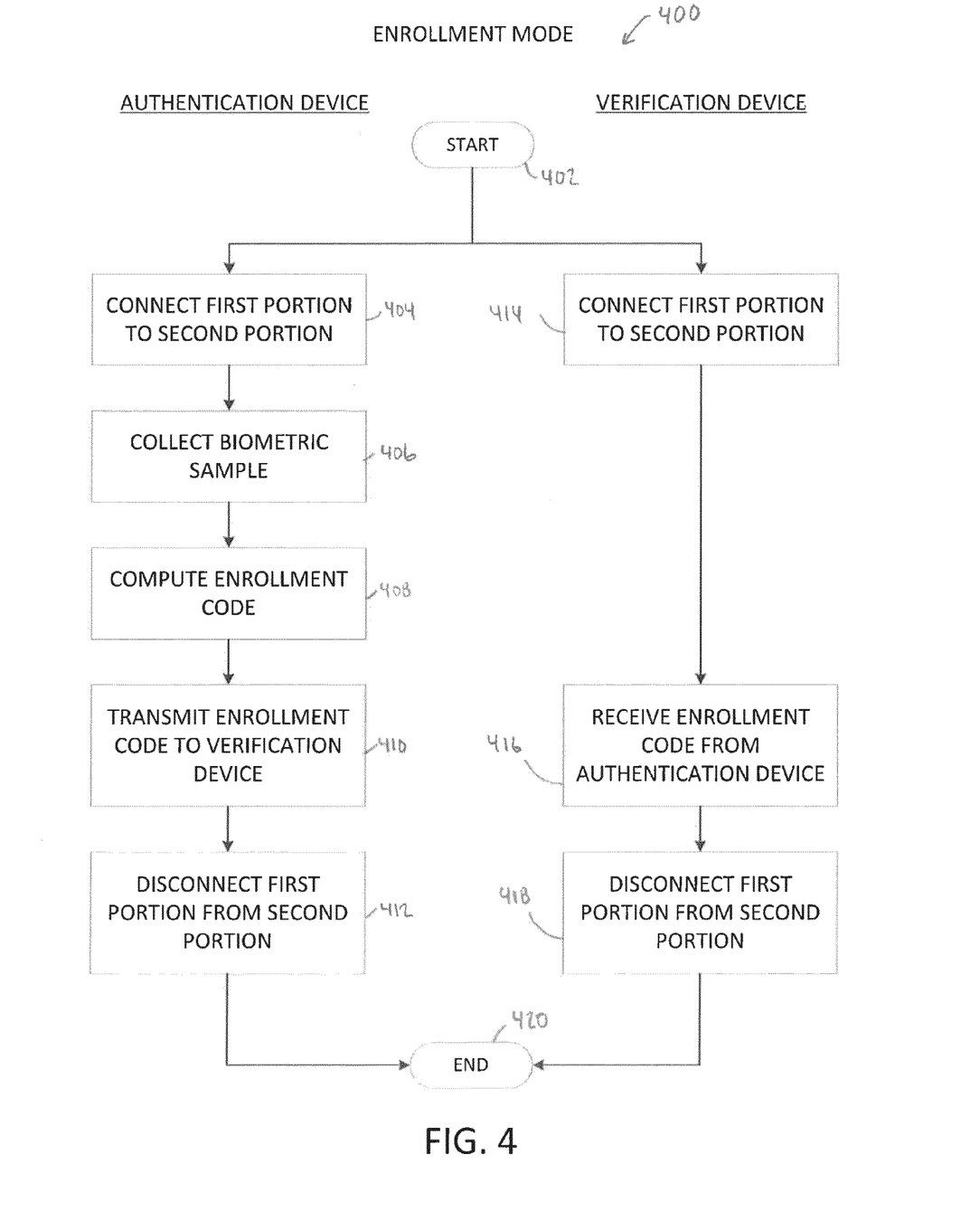
FIG. 4 is a flow diagram representing one example of a method of biometric enrollment, in accordance with one embodiment.

FIG. 4 is a flow diagram of a process 400 for enrolling one or more biometric samples in a biometric authentication system, according to one embodiment. Process 400 may be performed, for example, by the authentication device 110 and/or the verification device 120 described above with respect to FIGS. 3A and 3B, respectively.

Process 400 starts at block 402. Process 400 may vary depending on whether it is being performed by the authentication device 110 or the verification device 120. In the case where process 400 is being performed by the authentication device 110, process 400 proceeds to block 404, where the first portion 114 of the authentication device 110 is connected to the second portion 116. This places the authentication device 110 into an enrollment mode of operation. At block 406, a biometric sample is collected using, for example, a biometric sensor (e.g., sensor 112) disposed on the first portion 114 of the authentication device 110. At block 408, an enrollment code is computed based at least in part on the biometric sample. At block 410, the enrollment code is transmitted to the verification device 120 (e.g., wirelessly using the transmitter/receiver 214 disposed in the first portion of the authentication device 110). The enrollment code may be encrypted by the authentication device 120 prior to transmission. At block 412, the first portion 114 of the authentication device 110 may be disconnected from the second portion 116 to take the authentication device 110 out of enrollment mode and put it into an authentication mode of operation, as will be described below.

In the case where process 400 is being performed by the verification device 120, process 400 proceeds from block 402 to block 414, where the first portion 115 of the verification device is connected to the second portion 117. This places the verification device 120 into an enrollment mode of operation. At block 416, the verification device 120 receives the enrollment code (e.g., wirelessly using the transmitter/receiver 314 disposed in the first portion 115 of the verification device) that was transmitted by the authentication device 110. The enrollment code may be decrypted by the verification device 120 subsequent to receipt. The enrollment code may be stored in the memory 312 of the verification device 120 for future comparison with an access code. At block 418, the first portion 115 of the verification device 120 may be disconnected from the second portion 117 to take the verification device 120 out of enrollment mode and put it into an authentication mode of operation, as will be described below.

Process 400 ends at block 420.

Figure 5:
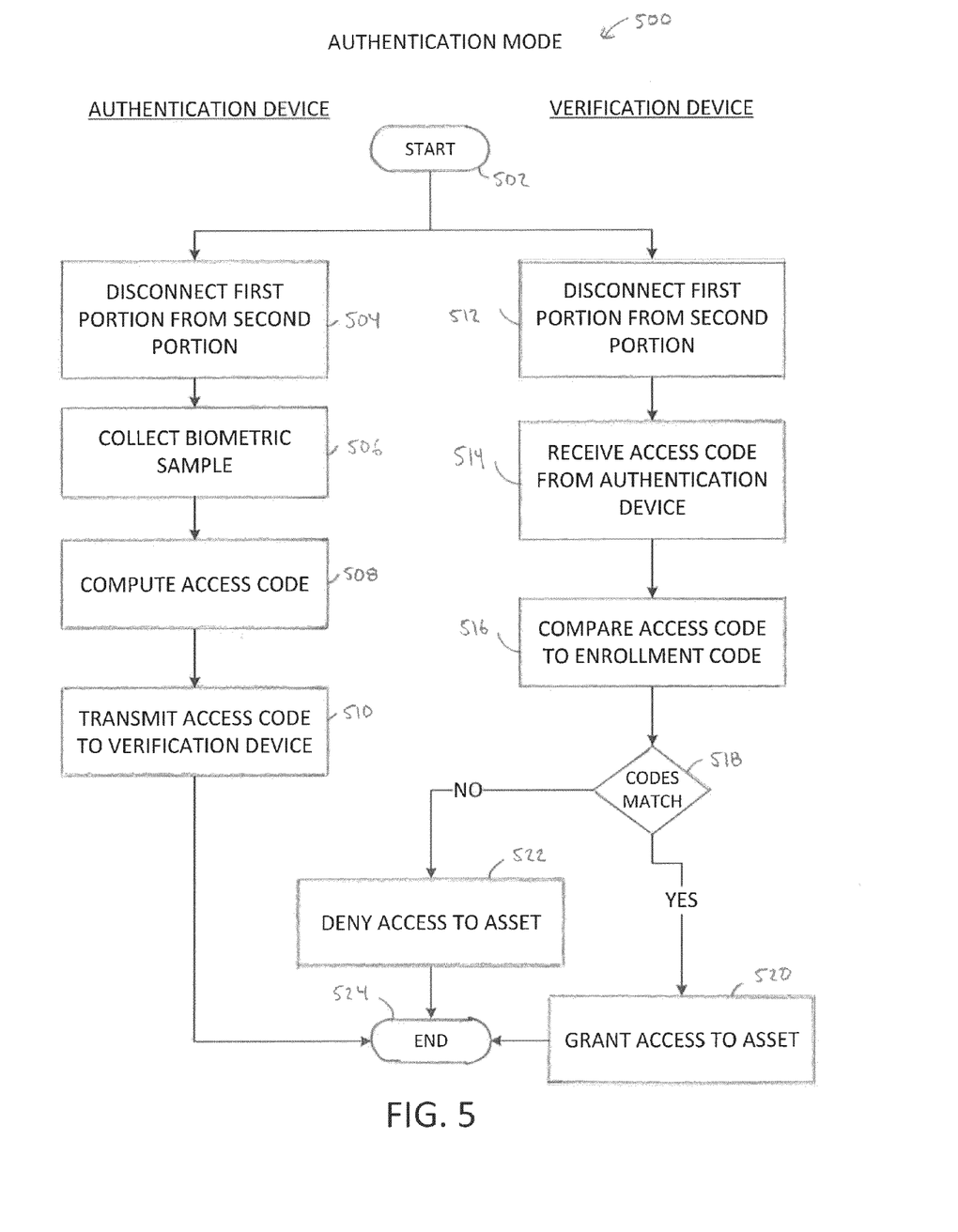
FIG. 5 is a flow diagram representing another example of a method of biometric verification and/or authentication, in accordance with another embodiment.

FIG. 5 is a flow diagram of a process 500 for authenticating, or verifying, one or more biometric samples in a biometric authentication system, according to one embodiment. Process 500 may be performed, for example, by an authentication device 110 and/or verification device 120 described above with respect to FIGS. 3A and 3B, respectively. The first portion 115 of the verification device 120 may be configured to be coupled to an asset in a manner that permits the first portion 115 to restrict access to the asset 130 (e.g., using a locking mechanism), such as described above.

Process 500 starts at block 502. Process 500 may vary depending on whether it is being performed by the authentication device 110 or the verification device 120. In the case where process 500 is being performed by the authentication device 110, process 500 proceeds to block 504, where the first portion 114 of the authentication device 110 is disconnected from the second portion 116. This places the authentication device into an authentication mode of operation. At block 506, a biometric sample is collected using, for example, the biometric sensor 112 disposed on the first portion 114 of the authentication device 110. At block 508, an authentication code, or access code, is computed based at least in part on the biometric sample. The access code may be compared with the enrollment code (e.g., the access code may be compared with the result of function g( ), described above), which may be stored in the memory 212 of the authentication device 110. If the codes do not match, the process 500 ends. However, if the codes do match, at block 508, the access code is transmitted to the verification device 120 (e.g., wirelessly using the transmitter/receiver 214 disposed in the first portion 114 of the authentication device 110). The enrollment code may be encrypted by the authentication device 120 prior to transmission.

In the case where process 500 is being performed by the verification device 120, process 500 proceeds from block 502 to block 512, where the first portion 115 of the verification device 120 is disconnected from the second portion 117. This places the verification device into an authentication mode of operation. At block 514, the verification device 120 receives the access code (e.g., wirelessly using the transmitter/receiver 314 disposed in the first portion 115 of the verification device 120) that was transmitted by the authentication device 110. The access code may be decrypted by the verification device 120 subsequent to receipt. At block 516, the access code is compared to the enrollment code (e.g., the access code may be compared with the result of function g( ), described above) and stored in the memory 312 during operation in enrollment mode, such as described above in process 400 with respect to FIG. 4.

At block 518, if the access code matches the enrollment code, access to the asset is granted at block 520; otherwise, access to the asset is denied at block 522.

Process 500 ends at block 524.

Example Applications

Figure 6A:
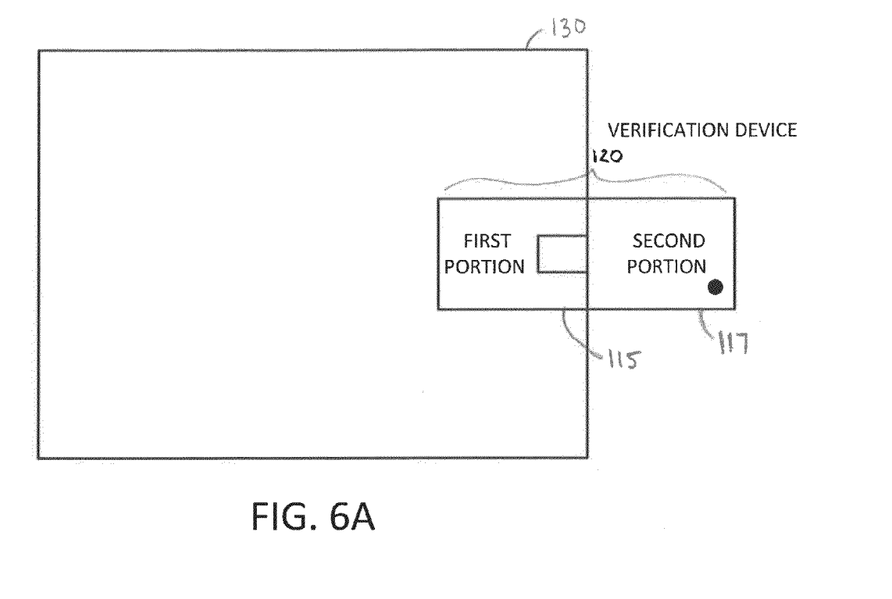
FIGS. 6A-6C are top views of one example of a verification device for biometric authentication, in accordance with one embodiment.
Figure 6B:
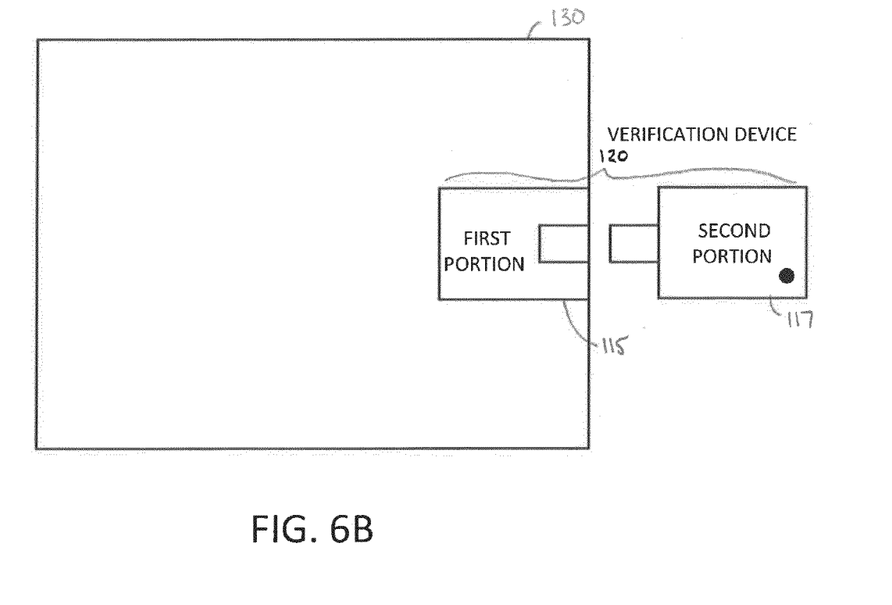
Figure 6C:
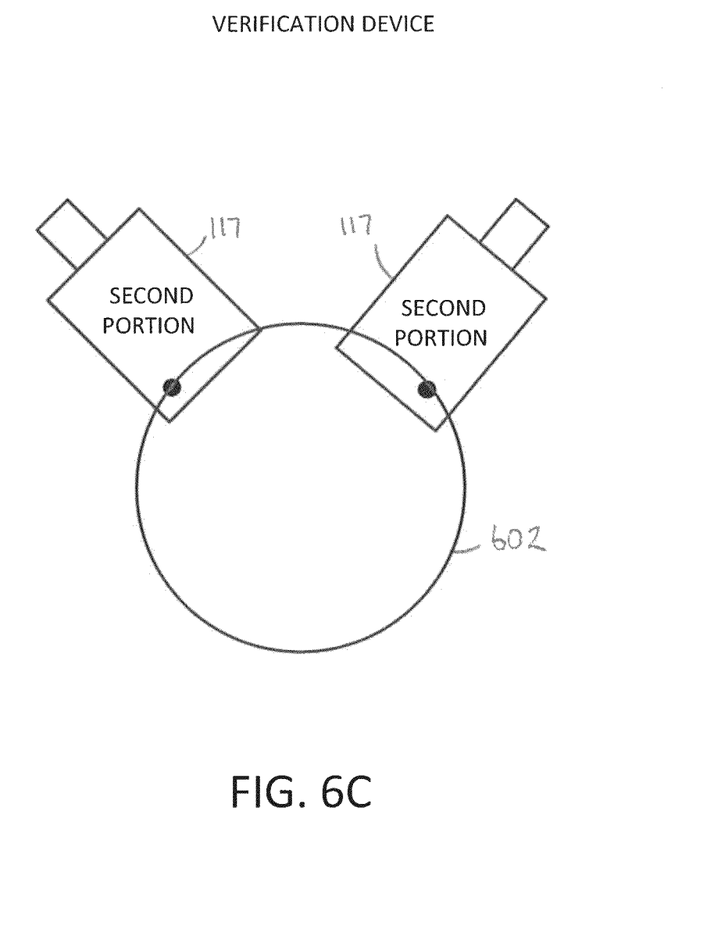

Various embodiments described herein may be implemented in a variety of applications. For example, the authentication device 110 may be embedded inside a belt buckle to provide private and convenient access to wearable devices, or built into a vehicle dashboard to provide access to the various systems and assets of the vehicle. In another example, as shown in FIGS. 6A and 6B, the first portion 115 of the verification device 120 may be integrated into an asset 130, and the second portion 117 of the verification device 120 may be releasably attached to the asset 130. FIG. 6A shows the second portion 117 connected to the first portion 115, and FIG. 6B shows the second portion 117 disconnected from the first portion 115. In another example, as shown in FIG. 6C, the second portion 117 of the verification device 120 may be attached to a key chain 602 for co-located storage in a secure place with the second portions 117 of other verification devices 120 that may be protecting other assets. In another example, the verification device 120 may be integrated into the circuitry of consumer electronics products, providing secure access to logical entities such as data, media, content, and product functions. In yet another example, the verification device 120 may be implemented as a locking mechanism, providing secure access to physical things such as rooms, containers, and equipment.

Having thus described several exemplary embodiments of the invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A biometric device comprising:
a first portion including:
a processor;
a biometric sensor operatively coupled to the processor and configured to acquire biometric data from a user; and
a transmitter operatively coupled to the processor; and
a second portion releasably coupled to the first portion;
wherein the processor is configured to:
determine whether the second portion is coupled to the first portion;
operate in an enrollment mode while the first portion is coupled to the second portion;
receive the biometric data while operating in the enrollment mode and, in response thereto, generate an enrollment code based at least in part on the biometric data;
transmit a signal containing the enrollment code using the transmitter;
operate in an authentication mode while the first portion is decoupled from the second portion;
receive the biometric data while operating in the authentication mode and, in response thereto, generate an access code based at least in part on the biometric data;
determine whether the access code matches the enrollment code; and
transmit a signal containing the access code using the transmitter in response to determining a match between the access code and the enrollment code.

2. The biometric device of claim 1, wherein the biometric data represents at least one of a fingerprint, a palm vein scan, a facial image, an iris scan, a voice sample, and a DNA sample.

3. A protection device configured to communicate with a biometric device, the protection device comprising:
a first portion including:
a processor;
a receiver operatively coupled to the processor; and
a memory operatively coupled to the processor; and
a second portion releasably coupled to the first portion;
wherein the first portion is configured to be coupled to an asset in a manner that permits the first portion to restrict access to the asset;
wherein the processor is configured to:
determine whether the second portion is coupled to the first portion;
operate in an enrollment mode while the first portion is coupled to the second portion;
receive a signal containing an enrollment code using the receiver while operating in the enrollment mode and, in response thereto, store the enrollment code in the memory;
operate in an authentication mode while the first portion is decoupled from the second portion;
receive a signal containing an access code using the receiver while operating in the authentication mode;
compare the access code to the enrollment code stored in the memory while operating in the authentication mode; and
based on the comparison, cause the first portion to grant access to the asset if the access code matches the enrollment code stored in the memory, else cause the first portion to deny access to the asset.

4. A biometric authentication method comprising acts of:
coupling a first portion of a biometric device to a second portion of the biometric device;
coupling a first portion of a protection device to a second portion of a protection device;
acquiring enrollment biometric data from a user via a biometric sensor disposed on the first portion of the biometric device while the second portion of the biometric device is coupled to the first portion of the biometric device;
generating, by a processor operatively coupled to the biometric sensor, an enrollment code based at least in part on the enrollment biometric data;
wirelessly sending, by a transmitter operatively coupled to the processor, a signal containing the enrollment code from the first portion of the biometric device to the first portion of the protection device;
storing the enrollment code in a memory disposed in the first portion of the protection device while the second portion of the protection device is coupled to the first portion of the protection device;
decoupling the second portion of the biometric device from the first portion of the biometric device;
acquiring verification biometric data from the user via the biometric sensor while the second portion of the biometric device is decoupled from the first portion of the biometric device;
generating, by the processor operatively coupled to the biometric sensor, an access code based at least in part on the verification biometric data;
determining, by the processor operatively coupled to the biometric sensor, whether the access code matches the enrollment code; and
wirelessly sending, by the transmitter, a signal containing the access code from the first portion of the biometric device to the first portion of the protection device in response to determining a match between the access code and the enrollment code.

5. The biometric authentication method of claim 4, wherein the enrollment biometric data represents at least one of a fingerprint, a palm vein scan, a facial image, an iris scan, a voice sample, and a DNA sample.

6. The biometric authentication method of claim 4, further comprising an act of determining, by the processor, whether a first identification code associated with the first portion of the biometric device matches a second identification code associated with the second portion of the biometric device, wherein the act of wirelessly sending the enrollment signal is performed in response to determining a match between the first identification code and the second identification code.

7. The biometric authentication method of claim 4, wherein the verification biometric data represents at least one of a fingerprint, a palm vein scan, a facial image, an iris scan, a voice sample, and a DNA sample.

8. A biometric authentication method comprising acts of:
coupling a first portion of a biometric device to a second portion of the biometric device;
coupling a first portion of a protection device to a second portion of a protection device;
acquiring enrollment biometric data from a user via a biometric sensor disposed on the first portion of the biometric device while the second portion of the biometric device is coupled to the first portion of the biometric device;
generating, by a processor operatively coupled to the biometric sensor, an enrollment code based at least in part on the enrollment biometric data;
wirelessly sending, by a transmitter operatively coupled to the processor, a signal containing the enrollment code from the first portion of the biometric device to the first portion of the protection device;
storing the enrollment code in a memory disposed in the first portion of the protection device while the second portion of the protection device is coupled to the first portion of the protection device;
decoupling the second portion of the biometric device from the first portion of the biometric device;
decoupling the second portion of the protection device from the first portion of the protection device;
coupling the first portion of the protection device to an asset in a manner that permits the first portion of the protection device to restrict access by the user to the asset;
acquiring verification biometric data from the user via the biometric sensor while the second portion of the biometric device is decoupled from the first portion of the biometric device;
generating, by the processor operatively coupled to the biometric sensor, an access code based at least in part on the verification biometric data;
wirelessly sending, by the transmitter, a signal containing the access code from the first portion of the biometric device to the first portion of the protection device;
comparing, by a processor disposed in the first portion of the protection device, the access code to the enrollment code stored in the memory of the protection device while the second portion of the protection device is decoupled from the first portion of the protection device; and
based on the comparison, causing the first portion of the protection device to grant access to the asset if the access code matches the enrollment code stored in the memory of the protection device, else causing the first portion of the protection device to deny access to the asset.

9. An authentication apparatus comprising:
a first portion having a processor, a biometric sensor operatively coupled to the processor, and a transmitter operatively coupled to the processor; and
a second portion releasably coupled to the first portion,
wherein the processor is configured, in an enrollment mode of operation, to:
acquire biometric data from a user via the biometric sensor;
generate an enrollment code based at least in part on the biometric data; and
transmit a first signal containing the enrollment code using the transmitter,
wherein the processor is further configured, in an authentication mode of operation, to:
acquire biometric data from the user via the biometric sensor;
generate an access code based at least in part on the biometric data and the enrollment code;
determine whether the access code matches the enrollment code; and
transmit a second signal containing the access code using the transmitter in response to determining a match between the access code and the enrollment code, and
wherein the processor is further configured to operate in the enrollment mode of operation while the second portion is coupled to the first portion and in the authentication mode of operation while the second portion is decoupled from the first portion.

10. An authentication apparatus comprising:
a first portion having a processor, a memory operatively coupled to the processor, and a receiver operatively coupled to the processor, the first portion being configured to be coupled to an asset in a manner that permits the first portion to restrict access to the asset; and
a second portion releasably coupled to the first portion;
wherein the processor is configured, in an enrollment mode of operation, to:
receive a first signal containing an enrollment code using the receiver; and
store the enrollment code in the memory,
wherein the processor is further configured, in an authentication mode of operation, to:
receive a second signal containing an access code using the receiver;
compare the access code to the enrollment code stored in the memory; and
based on the comparison, cause the first portion to grant access to the asset if the access code matches the enrollment code stored in the memory, else cause the first portion to deny access to the asset, and
wherein the processor is further configured to operate in the enrollment mode of operation while the second portion is coupled to the first portion and in the authentication mode of operation while the second portion is decoupled from the first portion.

* * * * *